United States Patent [19]

Rosenblum

[11] 4,236,099
[45] Nov. 25, 1980

[54] AUTOMATIC HEADLIGHT SYSTEM

[76] Inventor: Irving Rosenblum, 29757 69th St., No., Clearwater, Fla. 33515

[21] Appl. No.: 17,694

[22] Filed: Mar. 5, 1979

[51] Int. Cl.³ .............................................. B60Q 1/02
[52] U.S. Cl. ..................................... 315/83; 315/155; 315/156
[58] Field of Search ..................... 315/82, 83, 155, 156

[56] References Cited

U.S. PATENT DOCUMENTS

| | | | |
|---|---|---|---|
| 3,273,012 | 9/1966 | Rosenblum | 315/82 |
| 3,349,281 | 10/1967 | Collins | 315/83 |
| 3,423,633 | 1/1969 | Kawai et al. | 315/83 |
| 3,909,619 | 9/1975 | Kniesly et al. | 315/83 X |
| 4,139,801 | 2/1979 | Linares | 315/82 X |

*Primary Examiner*—Eli Lieberman
*Assistant Examiner*—Charles F. Roberts
*Attorney, Agent, or Firm*—Stanley M. Miller

[57] ABSTRACT

There is disclosed an automatic light system for a moving vehicle wherein there is provided an on/off control feature responsive to ambient light conditions and responsive to the activation of windshield wipers. Included in the on/off control feature is electronics for a built in delay to delay changes in the on/off condition of the headlights caused by sudden or gradual darkness, sudden or gradual light, and the starting of the vehicle. The automatic light system includes a high/low beam control feature which is responsive to oncoming or passing cars.

6 Claims, 3 Drawing Figures

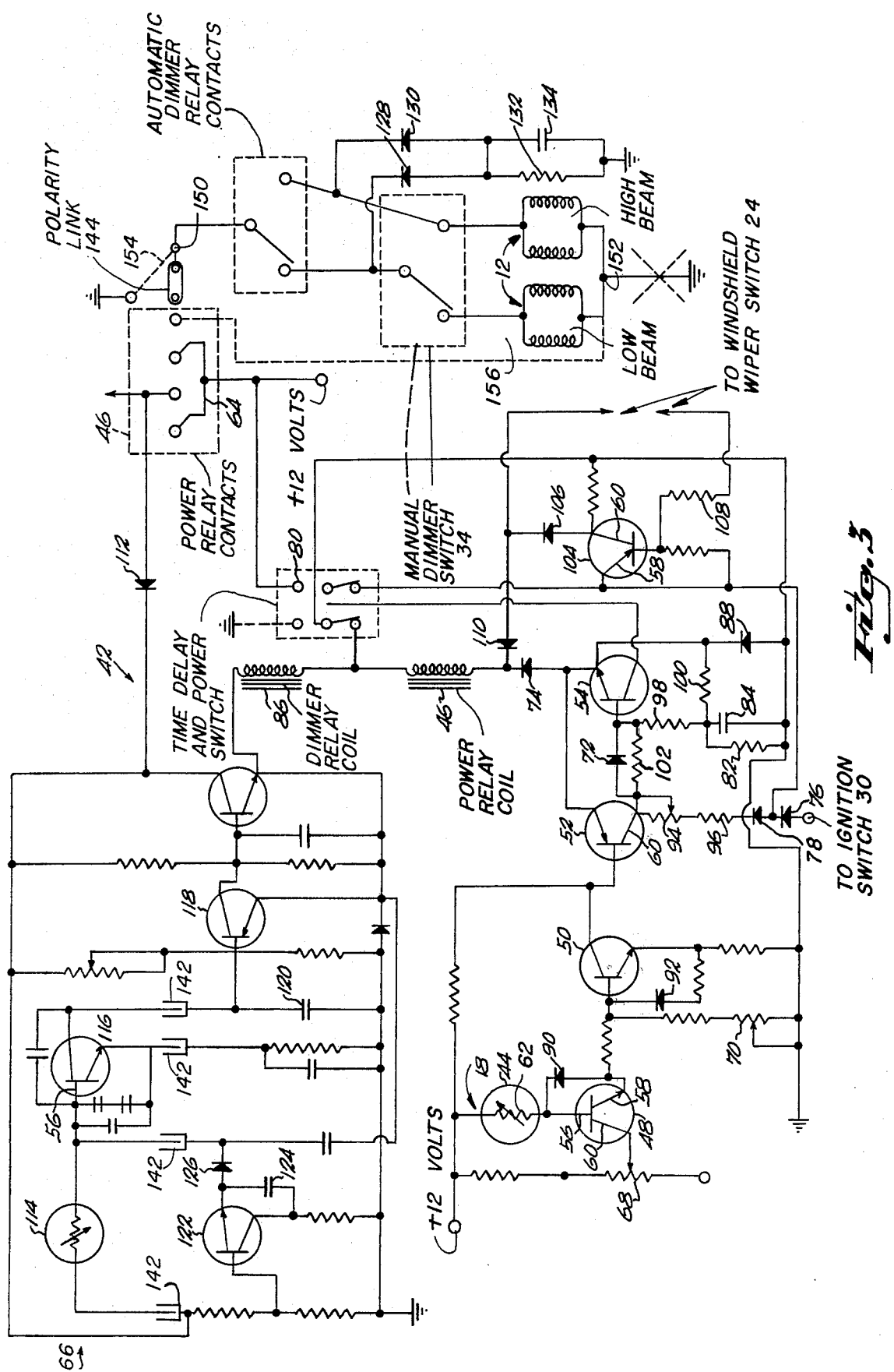

AUTOMATIC HEADLIGHT SYSTEM

FIELD OF THE INVENTION

The present invention relates to an automatic light control system for controlling the on/off state and the intensity of light of headlights of moving vehicles.

DESCRIPTION OF THE PRIOR ART

Controls for high/low beams for automobile lights are known as illustrated in U.S. Pat. No. 3,273,012 to I. Rosenblum.

SUMMARY OF THE INVENTION

The present invention relates to an automatic light system for controlling the on/off state and the intensity of light emanating from the headlights of a moving vehicle. A light sensor means is disposed in the engine compartment to receive ambient light, so that during daytime operation, the automatic light system will keep all lights off until dusk approaches, or until a heavy overcast sky sufficiently reduces ambient light. During the approach of early morning hours and daylight, the headlights are automatically turned off by the automatic light system. Moreover, delay means are incorporated into the automatic on/off control of the headlights so that brief interruptions of the ambient light condition, such as sudden darkness or sudden light, does not affect the overall operation of the on/off control feature of the headlights. Moreover, delay in activating the headlights upon starting the car with the ignition, avoids additional battery drain during starting. Means are provided for automatically turning on the headlights when the windshield wipers are activated. The headlights will turn off when the wipers are turned off, provided there is sufficient ambient light and the sky is not extremely cloudy. A main power switch to the automatic light system has two modes of operation. In the first mode, the headlights will be shut off immediately upon the ignition key being turned off. In the alternative mode, the lights continue to stay on for a predetermined period of time after the ignition key is turned off. A manual override is provided, where the manually operated headlights can be utilized entirely independent of the automatic light system. Combined with the above features, an automatic dimmer system for automatically switching the headlights to and from their high beam state, in response to prevailing driving conditions, is provided in the automatic light system.

A primary object of the present invention is to provide an automatic on/off control feature which is responsive to ambient light conditions of day, night, overcast skys, storms, and like environmental conditions. A related object is to prevent the headlights from being left on during daytime driving, preventing battery run down by leaving headlights on, preventing the vehicle operator from forgetting to turn the headlights on when starting the vehicle at night.

Another object of the present invention is to provide an on/off control feature to the headlights which is responsive to the activation and deactivation of the windshield wipers.

Yet another object of the present invention is to provide a high/low beam control feature for the headlights which is responsive to oncoming or passing cars, such feature being incorporated into the overall operation of the automatic light system. A related object of the present invention is to reduce inadvertant blinding of drivers in approaching vehicles, thereby possibly preventing an unforeseen accident. Another related object is the use of the headlights so that they remain on low beam during heavy fog conditions at night, preventing an excessively blinding condition.

Yet another object of the present invention is to provide means for delaying the turn off of the headlights so that the facility of lighting an area for a given time is provided, when the driver leaves the vehicle.

Yet another object of the present invention is to provide built in delay means for delaying the change of the on/off state of the headlights so as to account for brief periods of sudden darkness, sudden light, and to avoid battery drain while starting.

Yet another object of the present invention is to provide a manual override feature whereby manual operation of the headlights is accomplished independent of the automatic light system.

Yet another object of the present invention is to provide an automatic light system so as to allow driving with the proper beam of light for all driving conditions, relieve the driver of possible strain and annoyance of light switching, and permit the driver to concentrate more on safe driving.

A related object of the present invention is to provide all the above described features, in a system which is simple, easily controlled, relatively cheap to install, rugged and economical to control and operate. A related object of the present invention is to provide an automatic light system wherein the overall system is constantly working, without bells or buzzers needed as reminders to shut headlights off.

BRIEF DESCRIPTION OF THE DRAWINGS

Further objects and advantages of the present invention will become apparent as the following description proceeds, taken in conjunction with the accompanying drawings in which:

FIG. 3 is an electronic schematic of the circuitry of the present invention.

DESCRIPTION OF THE PREFERRED EMBODIMENT

Figure 1:
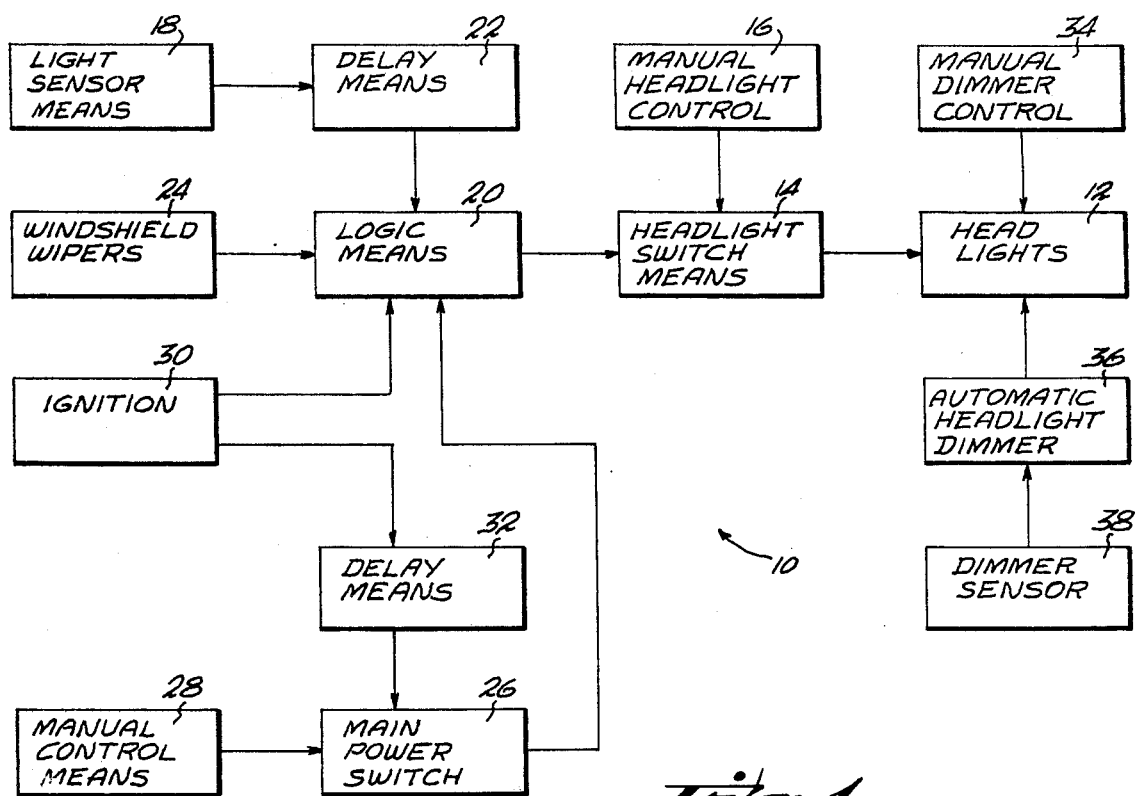
FIG. 1 is a block diagram of the present invention.

An automatic light system, generally indicated and designated by numeral 10, is disclosed for controlling the on/off state and intensity of light emission from a conventional headlight of a moving vehicle, such as an automobile or truck. Referring to FIG. 1, each headlight 12, normally of a pair of headlights of the moving vehicle, is controlled by an on/off switch 14. Normally, the on/off switch 14 is controlled by a conventional manual headlight control 16, which normally takes the form of a conventional hand manipulated in-out adjustable knob. The present invention includes a light sensor means 18, preferrably in the form of a photocell located under the hood of the moving vehicle in the engine compartment area. The light sensor means 18 is responsive to ambient light conditions. A logic means 20 receives detected light level signals from the light sensor beams 18, and if such signals are within predetermined ranges, the on/off switch 14 is activitated by logic means 20 to move into an on position or an off position. Such position is maintained until the logic means, in response to a change in light signals from light sensor means 18, implements a change in the condition of the switch 14. By virtue of this arrangement, the circuitry elements, to be described hereinafter, are adjusted, for daylight operation, so that the headlights 12 are maintained off until dusk approaches. Upon reaching a low enough ambient light level, such as dusk or a heavily overcast sky, the headlights 12 will be activated. Under daytime foggy conditions, the automatic light system 10 may not turn on, due to the bright ambient conditions that exist in a fog like environment. Hence, the headlights 12 can be manually activated by the manual headlight control 16. In the above described situations, the switch 14 is not activated. For night time operation, the switch 14 is normally in its on position. When driving in the early morning hours and daylight approaches, the headlights will be automatically turned off by the switch 14.

Delay means 22 are incorporated into the circuitry of the present invention so as to delay the logic means 20 in switching positions of the switch 14. More specifically, when there is a sufficient change in received light signals from the light sensor beams 18, the logic means 20 activates a change in positions of the switch 14. The delay means delays the state changing, triggering signal from the logic means 20 for a predetermined time period. If the conditions do not maintain the changed light conditions for a sufficient duration equal to this time period, the triggering signal is not provided to the switch 14. In daytime operation, where the headlights 12 are initially off, a drop in detected light levels will not activate the switch 14 to its on state unless the lower light levels exist for preferably, five to eight seconds. Hence, the automatic light system 10 is not activated for such situations as driving under an overpass. Likewise, when the moving vehicle is initially started, the headlights 12 will initially be off. Assuming the vehicle is started at night, the lights will not be activated for, preferably five to eight seconds thus eliminating any additional drain on the battery while starting the vehicle. For nighttime operation, where the normal mode of the switch 14 is in its on position, the delay means 22 is set so as to require a constant light source on the light sensor means 18 for approximately 25 to 30 seconds, before the logic means 20 will shut off the headlights 12. For instance, if during nighttime operation the hood required opening at night and the vehicle was parked under a street lamp, the headlights 12 would go off in 25 to 30 seconds. Upon closing the hood, the headlight 12 would come back on. It should be appreciated, that the manual headlight control 16 can always be used to manually activate the headlights 12. The manual headlight control 16 can be used entirely independently of the automatic light system 10, in that it is designed to override such system.

The logic means 20 is electrically coupled to the windshield wipers 24 and is operative in response to an enabling signal from the windshield wipers to control the position of the switch 14, as illustrated in FIG. 1. In operation, the headlights 12 will come on automatically when the windshield wipers are activated. In other words, the windshield wipers 24, when on, send the enabling signal to the logic means 20, which in turn activates the switch 14 to an on position, thereby turning on the headlight 12. Upon turning off the windshield wipers 24, the switch 14 is triggered to its off state, thereby turning off the headlights 12. By virtue of this arrangement, in event of rain, the headlights 12 come on automatically when the windshield wipers 24 are activated. The headlights 12 will turn off when the wipers are turned off provided there is ample ambient light being detected by the light sensor means 18, which would be the case if the sky is not extremely cloudy.

As depicted in FIG. 1, a main power switch 26 is provided for activating and deactivating the automatic light system 10. The power switch 24 can be triggered conductive by a manually operated control means 28. If the automatic light system 10 is deactivated by the main power switch 26, the headlights 12 can be operated in a conventional manner by utilization of the manual headlight control 16. If the main power switch 26 is activated in an on position then the automatic light system 10 is fully incorporated into the operation of the headlights 12. The main power switch 26 has two operating modes. First, in one mode, when an ignition 30 of the vehicle is turned off, the headlights 12 will shut off immediately. In the other mode, a second delay means 32 is utilized to keep the headlights 12 on for approximately 90 to 120 seconds after the ignition 30 is turned off. After this delayed period of time, the lights will turn off automatically. In the event of any malfunction of the automatic system, the main power switch 26 may be turned off, disengaging the automatic light system 10 entirely. It should be understood that the automatic light system 10 does not turn off the headlights 12 when they are manually turned on by the manual headlight control 16, even though the ignition has been turned off.

Figure 2:
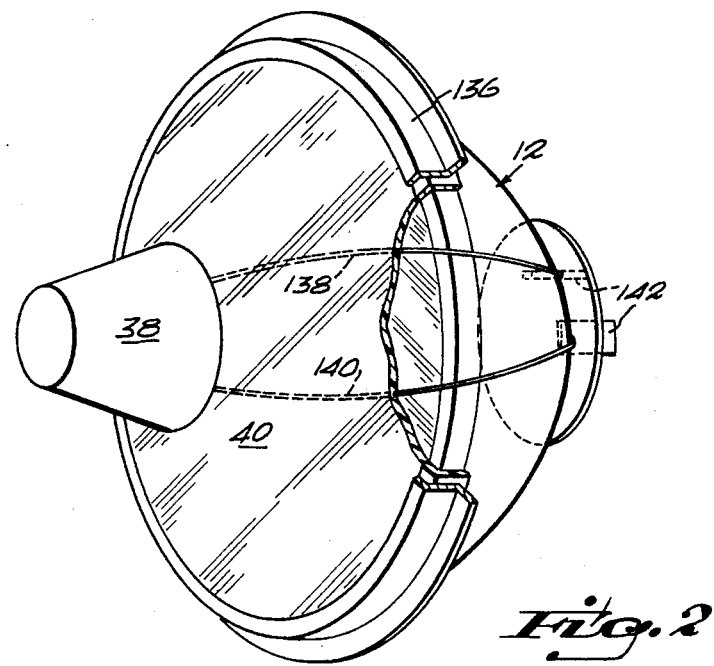
FIG. 2 is a cross-sectional view of the headlight of the present invention.

As illustrated in FIG. 1, the headlights 12, in a conventional manner can be controlled by a standard manual dimmer control 34, such control 34 typically taking the form of a foot operated, floor mounted switch. In the present invention, an automatic headlight dimmer 36 is incorporated to automatically dim the headlight 12 in response to the varying intensity of light from oncoming and/or passing vehicles. The specific structure of the automatic headlight dimmer 36 is not part of the present invention, in that a similar structure is disclosed in U.S. Pat. No. 3,273,012 by I. Rosenblum. However, the specific circuitry to accomplish the dimming function is intertwined in the overall circuitry so that the description of the circuitry necessary to accomplish the dimming function must be described. Furthermore, the incorporation of the dimming function in the overall automatic light system 10 adds novelty to the present invention in that a complete automatic system is provided. The automatic headlight dimmer 36 is electrically coupled to a dimmer sensor 38 and is operative in response to light intensity signals received from the dimmer sensor 38. Hence, the headlights 12 will be switched to their low beams when an oncoming car approaches the vehicle. It should be appreciated that the dimmer sensor 38 can be positioned at any location in which incoming light is received. As illustrated in FIG. 2, the dimmer sensor 38 may be exterioraly mounted relative to the glass plate 40 of a conventional headlight 12.

Referring to FIG. 1, the manual headlight dimmer control 34 must be kept in low beam position for automatic operation of the headlight dimmer 36. In this position the headlight 12 will switch from low to high beam and vice versa automatically. Placing the manual dimmer control 34 in the high beam position, oncoming lights will not lower the beam automatically. The automatic dimmer section is in an override condition. The manual dimmer control 34 must be returned to low beam position after attempting to pass a vehicle by signaling with headlights 12.

Now proceeding with the circuitry, there is illustrated, in FIG. 3, the circuitry 42 for developing signals in accordance with light intensity applied to photocell 44 of the light sensor means 18 from sunrise to sunset is by the sensor means 18 from sunrise to sunset is sufficient to keep the entire circuit in an off state, preventing activation of the power relay 46 until the ambient light has decreased sufficiently, whereby the sensor means 18 will cause current to flow through the amplifier, activating the power relay 46 and supplying the necessary voltages to the respective points in the circuit. At the proper threshold voltage the headlights 12 will turn on in the vehicle. For the circuitry to receive the proper threshold voltage, the surrounding ambient light that the sensor means 18 receives, must occur in a steady gradual decreasing rate, causing a steady increasing current flow respectively. The circuits sense this slow decrease in ambient light which satisfies one mode of the four modes to be explained. At the approach of sunrise, the sensor means 18 begins to receive the ambient light, thereby decreasing the current flow in the amplifying circuit, causing the power relay 46 to disengage, afterwhich the automobile lights will shut down. With the sensor means 18 in total darkness, and the switch of the vehicle ignition 30 activated, there is a time delay of an adjustable amount of seconds before the headlights 12 in the vehicle turn on. With the sensor means 18 in total darkness and the headlights 12 activated in the vehicle, in the event extranneous light were to enter the engine compartment and strike the sensor means 18, the automatic light system 10 would not shut down immediately, causing the vehicle headlights 12 to turn off. The light which entered the engine compartment would have to constantly strike the photocell for approximately 20–25 seconds before the system would shut down.

Referring to FIG. 3, a first mode of operation wherein sensing of ambient light at sundown occurs, the following circuitry used: a transistorized amplifier and trigger circuit is composed of transistors 48, 50, 52, and 54, each having respectively the usual base 56, emitter 58, and collector 60. Connected from a voltage source of 12 volts to the base 56 of 48 is a light sensitive resistance element 62 of photocell 44 which is variable in accordance with changes in light intensity impinging it. As the resistance of element 62 increases, so does the current flowing through the transistor 48, removing the cut-off state of 50. Current flows through 52 and 54 until a threshold voltage is reached across the coil impendance of the relay 46, resulting in activating same. The relay 46 has a moving arm 64 which engages a pair of contacts supplying the necessary voltages to the headlights 12 and accessory lights, along with also supplying the required voltages to the automatic dimmer circuitry 66. A potentiometer 68 is a coarse resistive adjustment for setting the required threshold voltage while a potentiometer 70 is an adjustable setting for different levels of threshold. Current flows, from the transistor 52 through a diode 72 to the transistor 54 and through a diode 74 to the coil impedance of relay 46. The automobile switch must be turned on so that the necessary 12 volts flows through a diode 76 and a diode 78 to the collector 60 of the transistor 52. The voltage source of 12 volts also flows through the diode 76 through a time-delay switch 80 to the collector 60 of the transistor 54. With the time-delay switch 80 left in this position, removing the ignition voltage will immediately remove the voltage present at the coil impedance of the relay 46, closing down the entire circuit and turning off all the vehicles' lights. With the time-delay switch 80 in the time-delay position, turning off the ignition will permit a slow discharge of voltage through a resistor 82 that had been stored in a capacitor 84 approximating 75 seconds. After discharging the capacitor 84, the voltage present at the relay 46 is removed, deactivating the relay 46, which in turn removes the voltage from all the lights in the vehicle. The power switch 80 serves to remove the ground return from both relays 46 and 86, necessary for activating the relay 46 and 86, thereby providing a complete shut-down of the entire system. The diode 78 serves to isolate the discharging circuit, composed of the capacitor 84 and the resistor 82, from any grounding condition existing in the vehicle. The diode 76 serves to protect the ignition system of the vehicle from any feedback voltage that may exist. The diodes 74 and 88 protect the transistor 54 from any spike voltages that may exist in the relay 46. Temperature compensation is made up of a diode 90 and a diode 92, including the transistors 52 and 54, connected in a complimentary configuration, may be called an inverted Schmitt trigger type circuit.

Referring to FIG. 3, a second mode of operating wherein ambient light is sensed at sunrise, operates in the manner described hereinafter. With the entire system activated, and all light in the vehicle on, with the approach of sunrise, ambient light will begin to impinge on the photocell 44, causing a reduction in its resistance and thereby causing an increase in voltage applied to base 56 of the transistor 48, afterwhich the transistor 50 will cease to conduct, closing down the transistors 52 and 54 and returning the relay 46 to its normally open condition, turning off all lights.

Referring to FIG. 3, a third mode of operation consists of having the ignition off, with the vehicle in total darkness. The photocell 44 is at its highest resistance, permitting the transistor 50 to be in an advanced state of conduction. The transistors 52 and 54 have to be activated to bring the entire circuit into operation. With the ignition 30 turned on, voltage flows through the diodes 76 and 78, a potentiometer 94 and a resistor 96 to the collector 60 of the transistor 52, bringing the transistor 52 to a state of readiness, while a portion of this same voltage flows through the diode 72, a resistor 98 and a resistor 100, bringing capacitor 84 to a charged condition of having the required threshold voltage to activate the relay 46. The time required to reach the proper threshold voltage is adjustable by the potentiometer 94, a typical value being approximately 5–10 seconds. This arrangement permits the starting of the vehicle engine prior to the activation of the vehicle lighting system. In this manner the drain on the vehicle battery is kept to a minimum while starting the engine. In the event of severe difficulty in starting the engine, whereby the headlights 12 activate prior to starting the engine, the power switch can be switched to turn the headlights 12 off, preventing excessive battery drain.

As illustrated in FIG. 3, a fourth mode of operation has the conditions of having the ignition on, the relay 46 activated, the headlights 12 on, and an immediate source of ambient light impinging upon photocell 44. With the photocell 44 in total darkness and its resistance being at its highest level and the transistors 50, 52, and 54 being in a fully conductive state, ambient light immediately applied to photocell 44 reduces its resistance causing the transistor 50 to saturate, thereby blocking conduction of the transistors 50 and 52. With the ignition voltage still applied to the transistor 52, capacitor 84 discharges through the resistor 96, a resistor 102, the transistor 52, the diode 74, the relay 46 in 20 to 25 seconds, thereby reducing the holding voltage of the capacitor 84 and causing the relay 46 to deactivate and open its contacts, shutting off the entire system. This mode acts as a safety feature to prevent an immediate shut down of the system in the event the photocell 44 was to accidentally receive some source of extraneous ambient light which impinged upon it. It would require a constant light source of 20 to 25 seconds before the entire system would deactivate.

For the activation of the headlights 12 at the same time the windshield wipers 24 are activated, we have a transistor 104 accomplishing the task of differentiating the systems being used in todays automobiles. Essentially, when a voltage of positive source is applied to a diode 110, the power relay 46 will activate and the headlights 12 will be turned on. This condition would be applicable to a grounded motor configuration. In the event of an ungrounded motor system, one side of a resistor 108 would return to ground by connecting it to the windshield wiper 24 switch on the vehicle causing the transistor 104 to conduct, transferring a source of positive voltage from the emitter 58 of the transistor 104 to the collector 60 through the diodes 106 and 110 to the power relay 46, turning on the headlights 12. When the resistor 108 is in an ungrounded condition, there is no voltage on the collector 60 of the transistor 104. Therefore, the transistor 104 has the distinct ability to make compatable a grounded or ungrounded windshield wiper motor to the existing system. The diode 106 prevents the transistor 104 from receiving a voltage from any source other than its own emitter 58. In the event it begins to rain at sundown and the windshield wipers 24 are activated, the headlights 12 will be turned on. As nighttime approaches and it necessitates turning off the windshield wipers 24, the headlights 12 would not be turned off at the same time because the photocell 44 has been sensing the ambient light changes and has placed the threshold circuit in a state of activation, keeping all lights on.

Referring to FIG. 3, for the automatic dimmer circuit 66 to begin operating, the power relay 46 has to be activated by the power control circuitry. Upon activation the relay 46 contacts are moved, permitting 12 volts to be applied to a diode 112, afterwhich the proper operating voltages flow throughout the automatic dimmer circuit 66.

As depicted in FIG. 3, a first mode of operation of the dimmer circuit 66 is in the daytime when the windshield wipers are activated. Upon activation of wipers 24, the power relay 46 is placed in operating condition so as to apply voltages to the dimmer circuits respectively. A photocell 114 resistance is low due to high ambient light conditions in the daytime. With a low resistance at the base 56 of a transistor 116, current does not flow through the transistor 116 to a transistor 118, keeping the threshold level low thus preventing the power relay 46 from activating. At this level the headlights 12 will remain in the low beam position.

With reference to FIG. 3, a second mode of operation of the dimmer circuit 66 is engaged during nighttime operation. With the power relay 46 activated, the necessary operating voltages are supplied to the automatic dimmer circuit 66. The photocell 114 resistance will vary with the light intensity impinging upon it. As the resistance of the photocell 114 increases, the current is permitted to flow through the transistor 116, charging a capacator 120 to the threshold level needed to activate the relay 86. The contact points of the relay 86 are moved to the opposite set of points, thereby applying the necessary voltage to the high beam section of the headlights 12. With light impinging on the photocell 114 by the approach of oncoming vehicles, the resistance of the photocell 114 is reduced, causing the transistor 116 to reduce its current output to the transistor 118 and thereby reducing the threshold level of voltage necessary to sustain the dimmer relay 86, so as to return the automatic dimmer relay contacts to the low beam position on the headlights 12. A transistor 122, a capacitor 124, and a diode 126 serve to apply a constant base voltage to the transistor 116 due to the changes in environmental temperature that exist in the engine compartment of an automobile.

Referring to FIG. 3, the polarity link is physically changeable to compensate for the variations in the polarity of switching employed at the headlights 12. As shown by the full lines in FIG. 3, in a first configuration the polarity link 144 connects terminal 150 to the positive voltage and terminal 152 is connected to ground. In a second configuration shown by the dotted lines in FIG. 3, polarity link 144 connects terminal 150 to ground potential via the dotted line 154 shown and terminal 152 is disconnected from ground (as indicated by the dotted X shown) and is connected to the positive voltage via the dotted line 156 shown. Diodes 128 and 130 in conjunction with a resistor 132, and a capacitor 134, reduce the arcing present at the contacts of the automatic dimmer relay 86.

Referring to FIG. 2, the dimmer sensor 38 may be exteriorly mounted relative to the transparent plate 40 of the conventional headlight 12. The transparent plate 40 can take the form of a glass or plastic plate which is secured over the standard headlight 12 by a retaining ring 136. The dimmer sensor 38 is secured to the plate 40, which allows the sensor 38 to be readily mounted to a preexisting headlight arrangement, without the replacement or substitution of headlights. Typically, a pair of leads 138 and 140, which electrically interconnect the sensor 38 and contacts 142, are imbedded in the transparent plate 40. The transparent plate 40 also provides the further advantage of preventing the breakage of the headlights 12 by thrown up rocks or like material commonly encountered during operation of the vehicle.

Although particular embodiments of the invention have been shown and described here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. An automatic light system for controlling the light emission of a vehicle headlight, comprising:
   light sensor means disposed within the darkened engine compartment of said vehicle to receive ambient light,
   control means for automatically turning on or off the headlight in response to detected light level signals from said light sensor means when said light level signals are within predetermined light level ranges,
   delay means for preventing the turning on or off of the headlight if the detected light level signals do not stay within the predetermined light level ranges for a predetermined period of time, polarity switching means connected between said vehicle headlight and the poles of an electric power source, for selectively switching the polarity of the voltage applied by said power source to said headlight, whereby on and off control of the headlight is accomplished without being affected by momentary, sudden darkness or light and additional battery drain during vehicle starting is prevented.

2. In the apparatus of claim 1, means for turning on the headlight when windshield wipers of the vehicle are turned on, means for turning off the headlight when the windshield wipers are turned off if ambient light conditions do not require the headlight to be on.

3. In the apparatus of claim 2, a dimmer light sensor disposed to receive light from oncoming or passing cars, low and high beam control means for automatically dimming the headlight in response to other vehicles.

4. In the apparatus of claim 3, means for selectively delaying the turning off of the headlights for a predetermined period of time after the ignition of the vehicle is turned off, whereby there lighting is provided for the period of time after leaving the vehicle.

5. In the apparatus claim 4, automatic override means for manually operating the headlight independently.

6. In the apparatus of claim 3, a transparent plate mounted on the front of the headlight, said dimmer light sensor being attached to said transparent plate.

* * * * *